United States Patent
Goto et al.

(10) Patent No.: US 7,511,440 B2
(45) Date of Patent: Mar. 31, 2009

(54) EMITTING DIRECTION CONTROL APPARATUS FOR LAMP

(75) Inventors: Kazuo Goto, Shizuoka (JP); Hideki Uchida, Shizuoka (JP); Manabu Sasa, Shizuoka (JP); Masataka Ando, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 66 days.

(21) Appl. No.: 11/494,146

(22) Filed: Jul. 26, 2006

(65) Prior Publication Data

US 2007/0035268 A1 Feb. 15, 2007

(30) Foreign Application Priority Data

Jul. 29, 2005 (JP) .................. P. 2005-220379

(51) Int. Cl.
*B60Q 1/12* (2006.01)
(52) U.S. Cl. ................. 318/286; 318/266; 318/272; 318/685; 362/465; 362/514
(58) Field of Classification Search ............... 318/685, 318/696, 560, 264–266, 272, 286, 293, 466–470; 362/37, 460, 464, 465, 466, 512, 514
See application file for complete search history.

(56) References Cited

U.S. PATENT DOCUMENTS 6,924,616 B2 * 8/2005 Yamamoto et al. ......... 318/685

| | | | |
|---|---|---|---|
| 7,118,237 B2 * | 10/2006 | Nishimura ............... | 362/37 |
| 2002/0064051 A1 * | 5/2002 | Sugimoto et al. .......... | 362/467 |
| 2003/0068181 A1 * | 4/2003 | Miyata et al. .............. | 399/394 |
| 2003/0076080 A1 * | 4/2003 | Le .............................. | 323/312 |
| 2007/0058380 A1 | 3/2007 | Tajima et al. .............. | 362/464 |

FOREIGN PATENT DOCUMENTS

| GB | 2 325 757 A | * 12/1998 |
|---|---|---|
| GB | 2325757 A | * 12/1998 |
| JP | 10-326505 | 12/1998 |
| JP | 2004-343987 | 12/2004 |

* cited by examiner

*Primary Examiner*—Bentsu Ro
(74) *Attorney, Agent, or Firm*—Fish & Richardson P.C.

(57) ABSTRACT

An emitting direction control apparatus for a lamp is provided with: a driver for deflecting an emitting direction for a lamp; and a controller that control the driver to perform a deflection. The controller includes an initialization function, for setting, at an initial position, a stepping motor that serves as a driving source for the driver. The initialization function detects a first current positional angle for the stepping motor; when the first current positional angle is greater than a reference angle, rotates the stepping motor in a bumping direction at a high speed until the reference angle is reached; after the reference angle has been reached, rotates the stepping motor to a bumped position an initial number of steps at a low speed; and after the bumped position has been reached, rotates the stepping motor in the reverse direction a predetermined number of steps and sets the stepping motor in the initial position.

7 Claims, 6 Drawing Sheets

EMITTING DIRECTION CONTROL APPARATUS FOR LAMP

The present application claims foreign priority based on Japanese Patent Application No. P.2005-220379, filed on Jul. 29, 2005, the contents of which are incorporated herein by reference.

BACKGROUND OF THE INVENTION

1. Field of the Invention

The present invention relates to an emitting direction control apparatus that changes the emitting direction of lamps like the headlamps of a vehicle, such as an automobile. Particularly, the present invention relates to an emitting direction control apparatus wherein a stepping motor is employed as a drive source of a drive mechanism that changes emitting directions.

2. Related Art

In order to ensure safe driving for automobiles, emitting direction control apparatuses have been provided that adjust the emitting directions of lamps, particularly headlamps, respectively in the vertical direction, and in the horizontal direction. The control apparatus for the vertical direction changes lighting axes of the headlamps vertically, so that these axes are in a predetermined direction, regardless of whether the inclination of the automobile is changed in accordance with the condition of loads or the condition of occupants in the automobile. The control apparatus for the horizontal direction changes the lighting axes of the headlamps in the traveling direction in accordance with a steering angle when an automobile is being driven along a curved road or around a corner in a road. Both control apparatuses include: a drive mechanism for changing the lighting axes of headlamps and a controller for controlling the drive mechanism; and based on the output of a sensor that detects the inclination of an automobile, or a steering angle, the controller permits the drive mechanism to appropriately change the lighting axes.

In these emitting direction control apparatuses, a stepping motor is employed as the driving source for the drive mechanism in order to control the lighting axes at each predetermined angle. The stepping motor is a motor that is rotated, step by step, at an angle that corresponds to the number of pulses of an input pulse signal, and to control the lighting axes at predetermined angle positions, the controller need only transmit, to the stepping motor, a number of pulse signals that correspond to the lighting axis angle of the adjustment. Further, the drive mechanism rotates a mechanism that reduces the speed of rotation of the stepping motor to change the lighting axis angles of the reflector of a lamp and a lamp body.

For an emitting direction control apparatus of this type, a so-called initialization is performed, wherein the stepping motor is set at a predesignated initial angular position (hereinafter referred to as an initial position) in order to very accurately control the lighting axis of the lamp. After the initialization has been performed, the stepping motor is rotated from the initial position, at an angle based on the number of steps, and the angle of the lighting axis is deflected. According to one method for performing the initialization, an angular sensor for detecting the lighting axis angle of a lamp is provided for the drive mechanism, the rotation position of the stepping motor is identified based on the output of the angular sensor, and the stepping motor is set at the initial position based on the rotation position. However, the angular position of the lighting axis detected by the angular sensor is a position obtained by reducing the rotational, angular velocity of the stepping motor. Further, while taking a detection error of the angular sensor, i.e., the resolution, into account, since the resolution is equivalent to about 100 steps, through the conversion of an angle into a single step of the stepping motor, it is extremely difficult for the stepping motor to be accurately set in the initial position when the angle of the angular axis is detected by the angular sensor.

According to another method used for initialization, the stepping motor is rotated in one direction, and is bumped to a maximum angular position (hereinafter this position is called a bumped position), which is a limiting position for the drive mechanism, whereat the lighting axis can be deflected in one direction. And the position whereto the stepping motor is rotated a predetermined number of steps from the bumped position is regarded as the initial position. According to this method, since the limiting position for the drive mechanism is uniquely defined, the initial position of the stepping motor can be precisely designated. This method is proposed in JP-A-2004-343987. Further, in JP-A-10-326505, a technique is proposed whereby initialization is performed by moving the stepping motor to the bumped position.

According to these initialization methods, when the stepping motor has been rotated to the bumped position in one direction, the stepping motor is reversely rotated a small angle by a repulsive force, the result of the bumping, and a rebound vibration occurs by repeating this phenomenon. This rebound vibration is gradually reduced as time elapses; however, a little time is required for the vibration to settle completely at "0", and because of this time (hereinafter called a rebound time), the initialization period for setting the initial position is required. Especially since the stepping motor is rotated rapidly in order to deflect the lighting axis at a high speed, the rebound vibration is remarkable, and the rebound time is extended and can not be ignored. According to the technique in JP-A-2004-343987, the stepping motor must be rotated in the reverse direction when the rebound is removed, and accordingly, the initialization period is extended. According to the technique in JP-A-10-326505, in order to resolve the rebound problem, in a state wherein rebound occurs, i.e., in a state wherein the stepping motor is rotated beyond the bumped position, the rotational speed of the motor is reduced and rebounding at the bumped position is suppressed, so that the rebounding period is shortened and the initialization period is reduced.

However, since the technique in JP-A-10-326505 is not one for removing rebound vibration, the rebounding period can not be "0", and the reduction during the initialization period is limited. Further, since the stepping motor is rotated at a high speed, the repulsive force produced by the rebounding is added as an impact force to the stepping motor. Thus, the stepping motor tends to be damaged and to be deteriorated, and its service life is shortened.

SUMMARY OF THE INVENTION

One or more embodiments of the present invention provide an emitting direction control apparatus for a lamp that can prevent rebound vibration produced by bumping against a stepping motor, can shorten an initialization period, and can reduce the deterioration of the stepping motor.

In accordance with one or more embodiments of the present invention, an emitting direction control apparatus for a lamp is provided with:
 a driver, for deflecting an emitting direction for a lamp; and
 a controller, for permitting the driver to perform deflection,
 wherein the controller includes an initialization function, for setting, at an initial position, a stepping motor that serves as a driving source for the driver, and wherein the controller includes, as the initialization function, a function for detecting a first current positional angle for the stepping motor; when the first current positional angle is greater than a reference angle, rotating the stepping motor in a bumping direction at a high speed until the reference angle is reached; after the reference angle has been reached, rotating the stepping motor to a bumped position an initial number of steps at a low speed; and after the bumped position has been reached, rotating the stepping motor in the reverse direction a predetermined number of steps and setting the stepping motor in the initial position.

Further, in accordance with one or more embodiments of the present invention, the controller may include a function, for, when the first current positional angle is smaller than the reference angle, rotating the stepping motor in the bumping direction a second number of steps at a low speed, and thereafter rotating the stepping motor in a reverse direction at a predetermined number of steps to set the stepping motor in the initial position. In this case, it is preferable that the controller include a function for detecting a second present angle after the stepping motor is set in the initial position; when a difference between the first current positional angle and the second current positional angle falls outside a permissible angle range, rotating the stepping motor to the bumping position the first number of steps at a low speed; and after the bumping position has been reached, rotating the stepping motor a predetermined number of steps in a reverse direction to set the stepping motor in the initial position.

In addition, it is preferable that rotation in the reverse direction be performed at a high speed.

Further, the lamp may be a vehicle headlamp and the driver may swing the vehicle headlamp in a horizontal direction.

According to one or more embodiments of the present invention, until a reference angle is reached, the stepping motor is rotated at a high speed, and after the reference angle is reached, the stepping motor is rotated at a low speed and is bumped to the bumped position. Therefore, the rebound vibration, which occurs when bumping is performed while the stepping motor is rotating at a high speed, can be suppressed and the rebounding period can be reduced. Further, compared with when bumping is performed while the stepping motor is rotating at a high speed, the period required to reach the reference angle can be shortened.

Further, according to one or more embodiments of the present invention, when the stepping motor is locate data highly probable angle area, the stepping motor need only be rotated the first number of steps, and the predetermined number of steps, for the initialization to be terminated. In this case, the stepping motor is rotated at a low speed only when the initialization is insufficient, and bumping and initialization are performed, so that rebound vibrations can be reduced and the rebound time can be shortened.

Therefore, the time required to halt the stepping motor at the bumped position can be reduced, and as a result, the initialization time can be shortened. Further, since the stepping motor is rotating slowly when it is bumped, the impact due to the repulsive force that counters the bumping is lessened, and deterioration of the stepping motor is prevented.

Other aspects and advantages of the invention will be apparent from the following description and the appended claims.

DETAILED DESCRIPTION OF THE EXEMPLARY EMBODIMENTS

Exemplary embodiments of the invention will be described with reference to the accompanying drawings.

Figure 1:
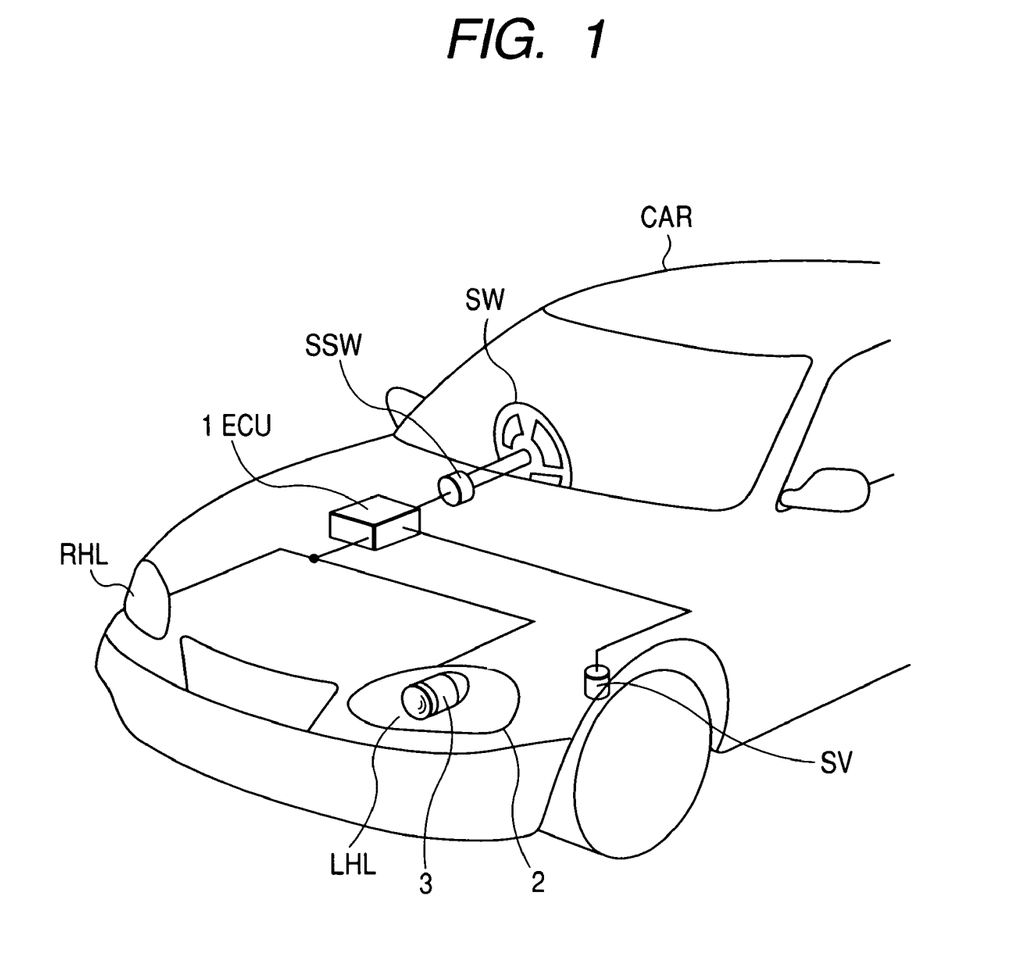
FIG. 1 is a general diagram showing an automobile wherein an exemplary embodiment of the present invention is applied for an AFS.

FIG. 1 is a schematic diagram showing the outline of an automobile where in an exemplary embodiment the present invention is applied for an adaptive front-lighting system (hereinafter referred to as an AFS). A steering sensor SSW for detecting a steering angle is provided for a steering wheel SW of an automobile CAR, and a speed sensor SV for detecting the speed 15 of a vehicle is provided for the drive mechanism of the automobile. The outputs of the sensors SSW and SV are transmitted to an electronic control unit (hereinafter referred to as an ECU) 1. Based on the individual sensor outputs, the ECU 1 identifies the travel state of the automobile CAR, and employs the thus 20 identified travel state to deflect (swivel), in the horizontal direction, the lighting axes of headlamps LHL and RHL, which are located on the left and right front of the automobile CAR. As will be described later, the left and right headlamps LHL and RHL include horizontally rotary projector lamps incorporated in the lamp bodies. The projector lamps are to be horizontally inclined by an actuator, which is a drive mechanism, and in this manner, the lighting axes of the projector lamps can be deflected.

Figure 2:
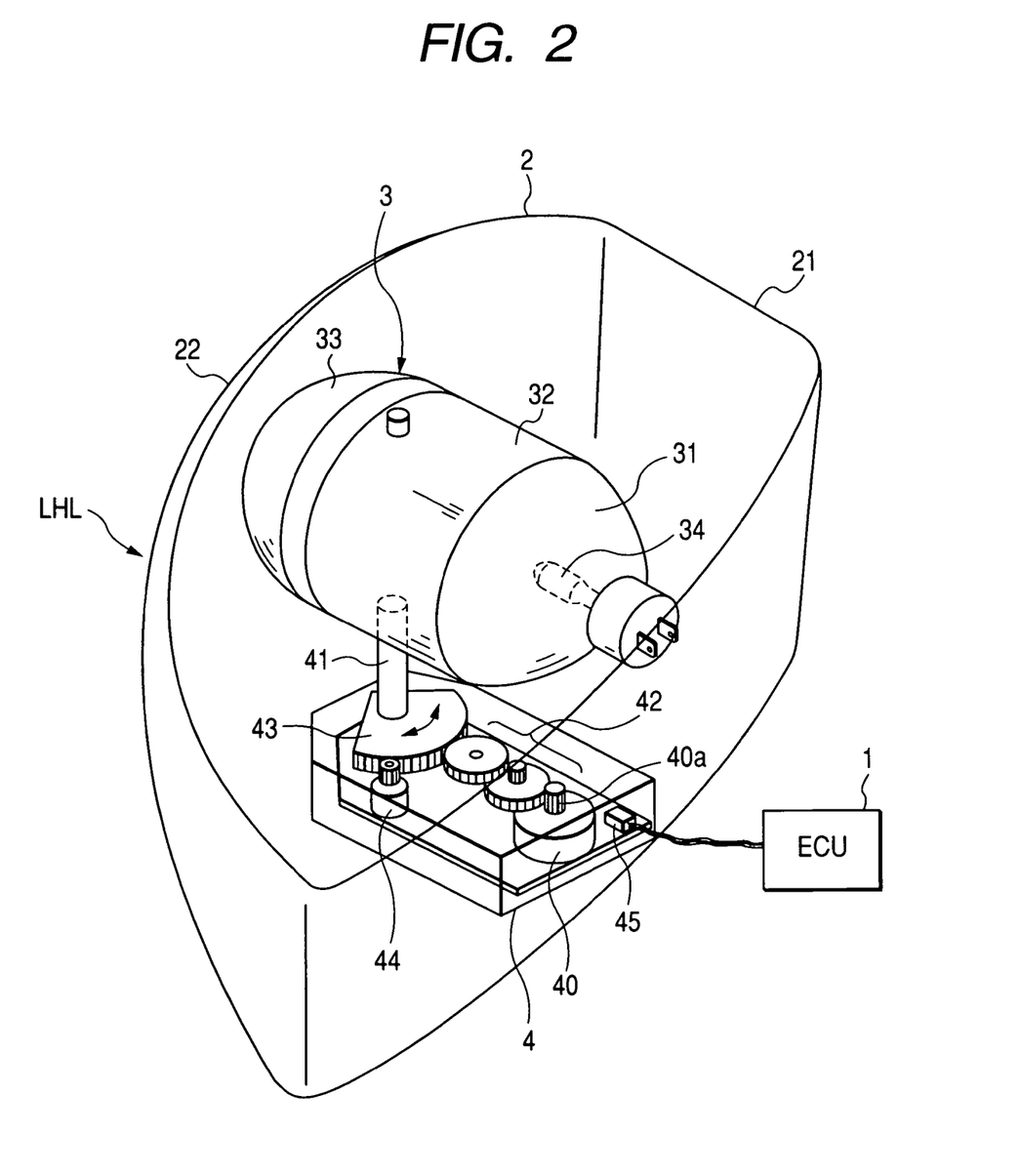
FIG. 2 is a schematic perspective view of the arrangement of a headlamp.

FIG. 2 is a schematic perspective view of the arrangement of the left headlamp LHL. A lamp housing 2 of the left headlamp LHL is constituted by a lamp body 21 and a transparent front cover 22, attached to the front face of the lamp body 21, and a projector lamp 3 that is incorporated in the lamp housing 2. For the projector lamp 3, a lens 33 is attached, via a cylindrical spacer 32, to the front of a reflector 31 having a hemi-spheroid shape, and an incandescent bulb or a discharge bulb is incorporated as a light source 34 within the reflector 31. Since the projector lamp 3 is well known, no further or detailed explanation for it will be given. Below the projector lamp 3, an actuator 4 is located that serves as a drive mechanism for performing a deflection operation, and a rotation output shaft 41 of the actuator 4 is coupled with the lower face of the projector lamp 3. Consonant with the rotation of the rotation output shaft 41, the projector lamp 3 is rotated horizontally within a designated angular range, and the lighting axis of the projector lamp 3, i.e., the left head lamp LHL, is swiveled.

As shown in FIG. 2, the actuator 4 includes a stepping motor 40 as a drive source, and a speed reducing gear string 42, consisting of a plurality of gears, is coupled with a gear 40a that is integrally formed with the rotary shaft of the stepping motor 40. A sector gear 43 engages the last gear of the speed reducing gear string 42, and the rotary shaft of the sector gear 43 serves as the above described rotation output shaft 41, which deflects the projector lamp 3. Further, an angle sensor 44, such as a potentiometer, engages a part of the sector gear 43 to detect the rotational angle of the sector gear 43, and the actuator 4 is electrically connected to the ECU 1 via a connector 45. Thus, when the stepping motor 40 is rotated in accordance with a control signal transmitted by the ECU 1, the rotational output of the stepping motor 40 is transmitted to the sector gear 43, while the speed of rotation 10 is reduced by the speed reducing gear string 42. And as the sector gear 43 is rotated, the projector lamp 3, coupled thereto, is inclined horizontally, causing the lighting axis to be deflected. Furthermore, the rotational angle of the sector gear 43 is detected by the angle sensor 44 and is output to the ECU 1 as the lighting axis deflection angle of the projector lamp 3. This same process is performed for the right head lamp RHL.

Figure 3:
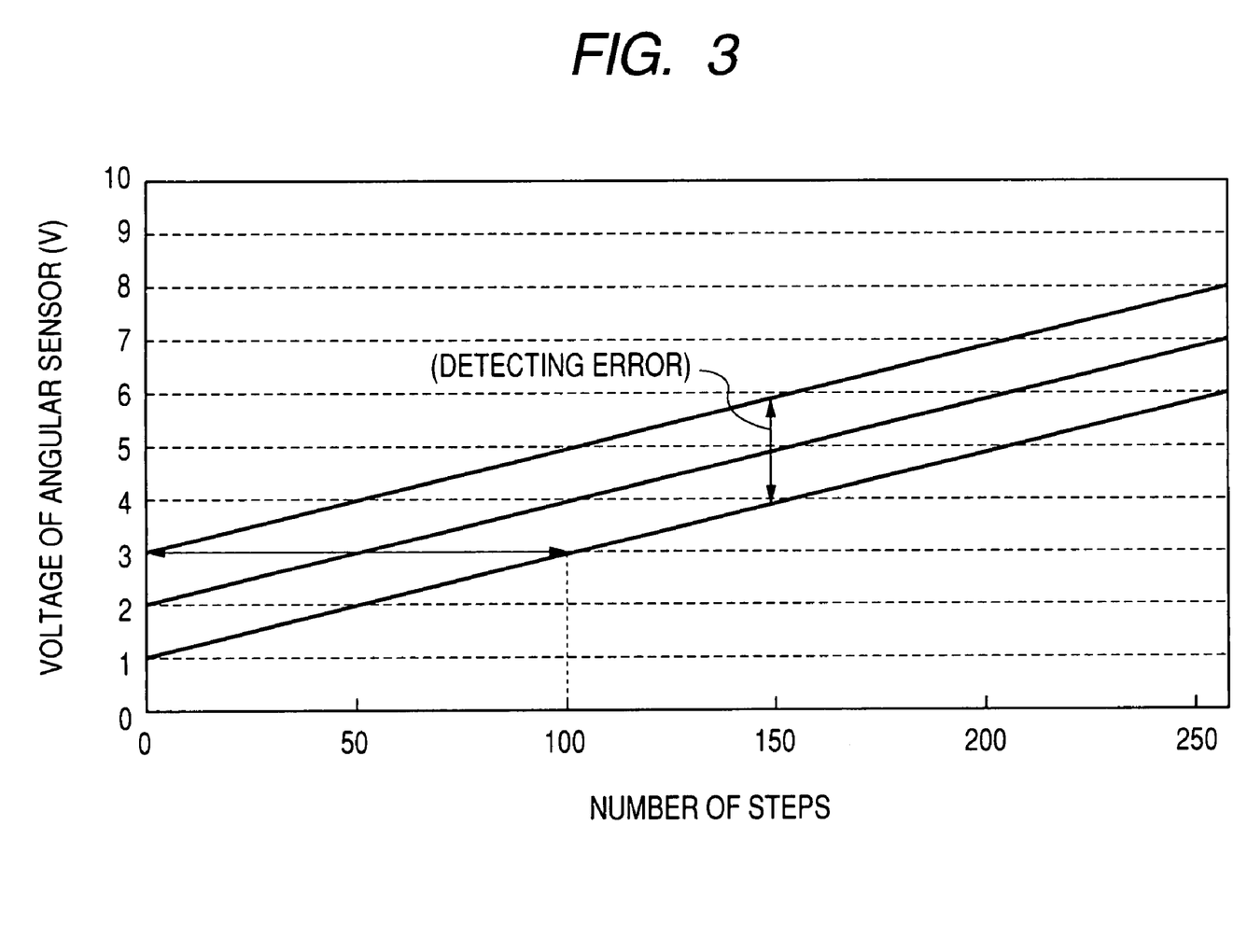
FIG. 3 is a graph showing a relation between the number of steps entered for a stepping motor and an error for an angle sensor.

The stepping motor 40 receives a step signal output by the ECU 1, and is rotated, step by step, to an angular position that corresponds to the number of steps indicated by the step signal. FIG. 3 is a graph showing the number of steps indicated by a step signal input to the stepping motor 40, and a voltage output by the angle sensor 44 that detects the deflection angle of the projector lamp 3, which is rotated in consonance with the rotation of the stepping motor 40. As is apparent from this graph, the output voltage of the angle sensor 44 has a detection error of ±1.0, due to the resolution of the angle sensor 44 or a mechanical error such as backlash, which may occur at the speed reducing gear string 42. Through conversion into the number of steps for the stepping motor 40, the detection error is 100 steps. That is, even though the rotational angle position of the stepping motor 40 is calculated based on the output voltage of the angle sensor 44, an error may occur within a maximum of 100 steps, and when the error is converted into the rotational angle of the stepping motor 40, which is rotated 0.1 degree at each step, the error will be 10 degrees. Because of this detection error for the angle sensor 44, when the rotational position of the stepping motor 40 is to be detected based on the output of the angle sensor 44, as previously described, the rotational position, especially the initial position for the stepping motor 40, can not be accurately identified.

According to an AFS having the above described arrangement, when the steering angle is changed by the rotation of the steering wheel SW of the automobile CAR, and when the steering angle signal detected by the steering sensor SSW is transmitted to the ECU 1, the ECU 1 transmits to the actuator 4 a step signal indicating a number of steps that corresponds to the steering angle, and rotates the stepping motor 40 of the actuator 4 to a rotational angle position that corresponds to that number of steps. The rotational output of the stepping motor 40 is then transmitted to the sector gear 43, via the speed reducing gear string 42, to rotate and position the sector gear 43 at a predetermined angular position. Thus, the projector lamp 3, which is coupled with the rotation output shaft 41, can be positioned at the corresponding rotational position, and the lighting axis of the headlamp can be deflected in a direction corresponding to the steering angle. To control the deflection of the headlamps, at the control start time, i.e., when the ignition switch of the automobile is turned on, the ECU 1 performs a predesignated initialization, so as to set the stepping motor 40 at an initial position. Thereafter, by employing the initial position as a reference, the number of steps to be supplied to the stepping motor 40 can be calculated, and a step signal can be output to deflect the lighting axes of the headlamps.

Figure 4:
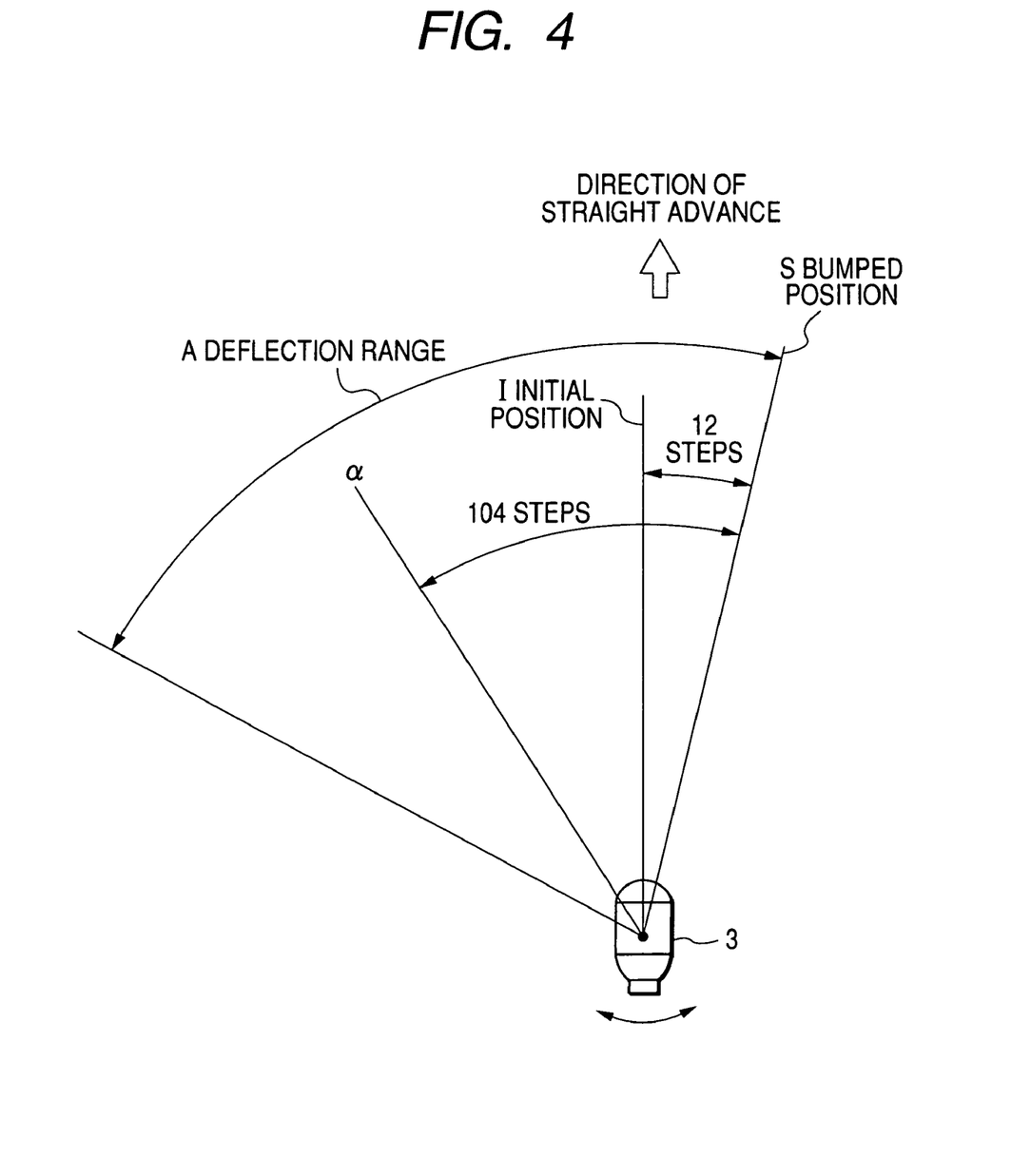
FIG. 4 is a diagram showing a relation between the deflection angle of the stepping motor and the number of steps.

The initialization operation for setting the stepping motor 40 at the initial position will now be described while referring to FIG. 4. FIG. 4 is a diagram showing the rotational angle of the stepping motor 40 and the corresponding number of steps. In FIG. 4, A indicates the deflection range of the left headlamp LHL (projector lamp 3). The innermost limit position of the deflection range A is a bumped position S to which the stepping motor 40 is bumped by being rotated inward. For the left headlamp LHL, the bumped position S is a position to which the stepping motor 40 has been rotated in a direction in which the lighting axis is deflected to the right, and the sector gear 43 has been rotated to the right the maximum distance. The position to which the stepping motor 40 is rotated outward from the bumped position S, i.e., 12 steps to the left, is defined as an initial position I. In order to perform the initialization operation for setting the stepping motor 40 at the initial position, conventionally, the ECU 1 employs a method according to which the stepping motor 40 is first rotated to the bumped position S and is then rotated, from the bumped position S, 12 steps in the reverse direction. According to this method, as described in the background art, there is a derived problem associated with rebound vibration. In FIG. 4, α denotes a reference angle, which will be described later, that in this case is designated as being 100 steps from the bumped position S.

Figure 5:
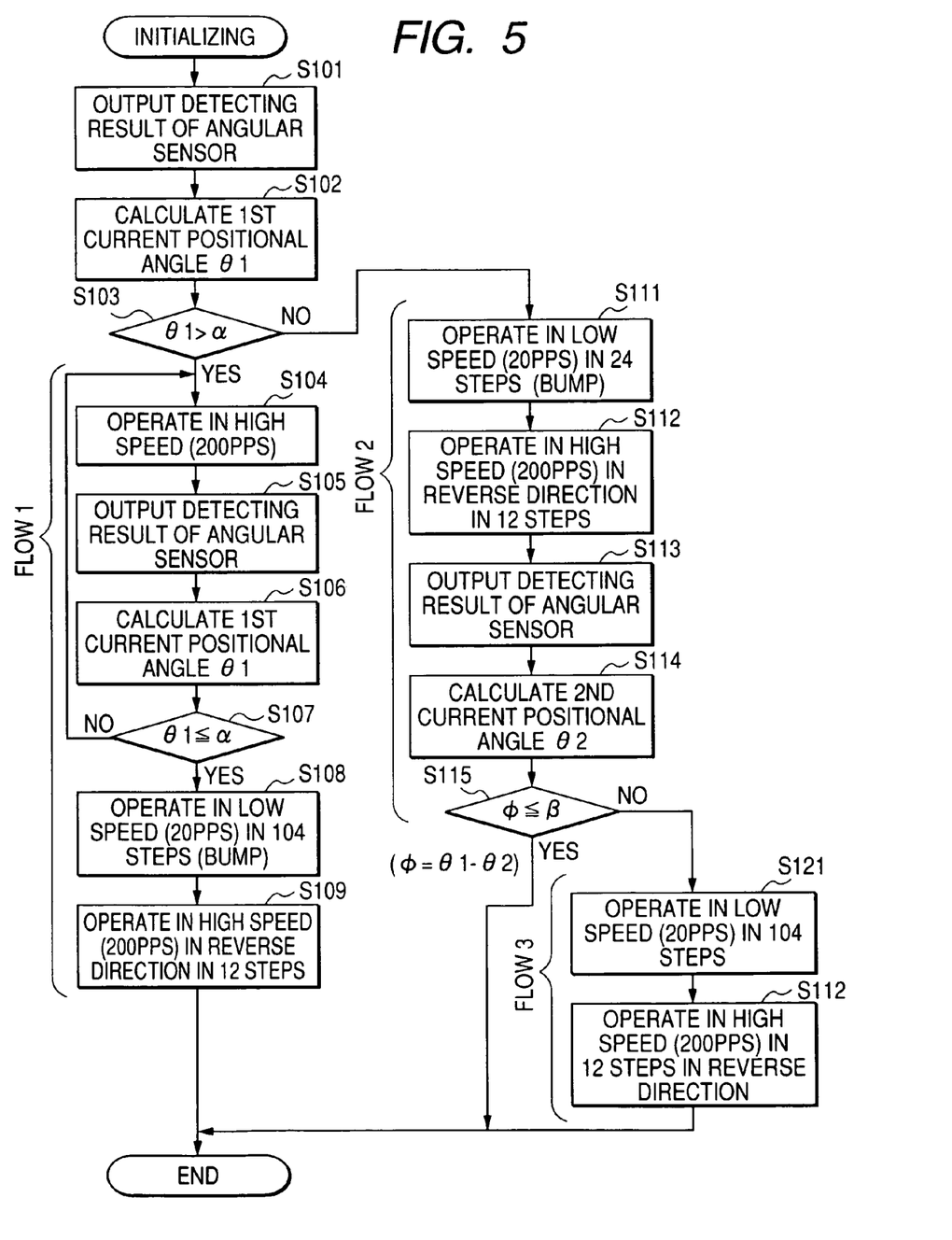
FIG. 5 is a flowchart for explaining an initialization operation.

FIG. 5 is a flowchart for the initialization operation according to the exemplary embodiment. First, the ECU 1 fetches a voltage detected by the angle sensor 44 of the actuator 4 (S101), employs the detected voltage to detect the deflection angles for the lighting axis of a headlamp, and employs the deflection angles to calculate the first current positional angle θ1 for the stepping motor 40 (S102). The obtained first current positional angle θ1 is obtained as an angle calculated from the bumped position S, and may include as an error an angle (ten degrees) that corresponds to 100 steps, which is the resolution for the angle sensor 44. Therefore, the ECU 1 determines whether the obtained first current positional angle θ1 is greater than the reference angle α, calculated from the bumped position (S103). As is shown in FIG. 4, the reference angle α is an angle of ten degrees, which corresponds to the resolution of the angle sensor 44, and is the equivalent of 100 steps.

When the ECU 1 determines at step S103 that the first current positional angle θ1 is greater than the reference angle α, flowchart 1 is performed. As shown for the rotational movement of the stepping motor 40 in FIG. 6A, in flowchart 1 a step signal is transmitted to the stepping motor 40 for the high speed rotation of the stepping motor 40 inward (S104). For the step signal, fast rotation is defined as being 200 pps (pulse/second). At this time, the ECU 1 fetches, as needed, a detected voltage output by the angle sensor 44 (S105), calculates the first current positional angle θ1, based on the fetched detected voltage (S106), and compares the first current positional angle θ1 with the reference angle α (S107). This process is repeated until the first current positional angle θ1 equals the reference angle α.

Figure 6A:
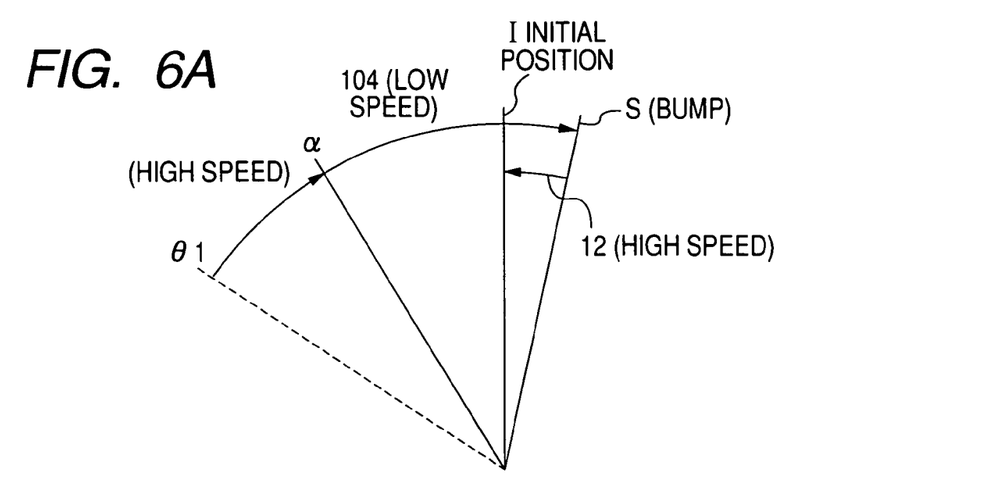
FIGS. 6A, 6B and 6C are diagrams that, in addition to FIG. 4, are used to explain the operations in flowcharts 1, 2 and 3.

When it is determined that the first current positional angle θ1 has been reduced and is equal to the reference angle α, the ECU 1 decelerates the step signal to be input to the stepping motor 40 in order for the stepping motor 40 to rotate slowly. For the step signal, slow rotation is defined as being 20 pps. When the step signal for which 104 steps is indicated is input, the stepping motor 40 arrives at the bumped position S while rotating slowly, and is halted at the bumped position S (S108). At this time, since the rotational speed of the stepping motor 40 is low, rebound vibration at the bumped position S is suppressed. Further, after the stepping motor 40 has moved 100 steps, an extra step signal for only four steps is transmitted to the stepping motor 40, so that if rebound vibration occurs, the rebound vibration will be ended quickly and the rebound time will be extremely short. Theoretically, as a step signal to be supplied to the stepping motor 40 during low speed rotation, 100 steps must be indicated, in consonance with the steps for the reference angle α. However, in actuality, 104 steps are indicated because it is preferable that the number of steps be greater than 100, so that accurate bumping can be performed while taking a mechanical error of the actuator 4 into account, and so that the number of steps will be a multiple of four and control of the stepping motor 40 can thus be provided.

After the stepping motor 40 is hit at the bumped position S, a step signal for rotating the stepping motor 40 in the reverse direction is transmitted to rotate the stepping motor 40 outward (S109). This step signal is a signal for a high speed (200 pps) movement, as at step S104, to a position 12 steps from the bumped position S. Upon receiving the step signal, the stepping motor 40 is halted at the initial position I, 12 steps from the bumped position S and in the reverse direction. In this manner, the initialization operation for the stepping motor 40 is completed.

Therefore, when the first current positional angle $\theta1$ for the stepping motor 40 is greater than the reference angle $\alpha$, the stepping motor 40 is rotated at a high speed until the reference angle $\alpha$ is reached. Then, after the reference angle $\alpha$ has been reached, the stepping motor 40 is rotated at a low speed and is bumped to the bumped position S. Thus, the rebound vibration that could occur when the stepping motor 40 is rotated and bumped at a high speed can be suppressed, and the rebound time can be reduced. Furthermore, compared with a case wherein, in order to suppress rebound vibration, the stepping motor 40 is rotated at a low speed across the entire deflection range A before being bumped, at the least, the time required to reach the reference angle $\alpha$ can be reduced. Therefore, the period required to halt the stepping motor 40 at the bumped position S can be shortened, and as a result, the length of the initialization period required to set the stepping motor 40 at the initial position I can be reduced. In addition, since the stepping motor 40 is rotating slowly when it is bumped, the impact reaction when the stepping motor 40 is bumped is dampened, and deterioration of the stepping motor 40 is slowed.

When, at step S103, the first current positional angle $\theta1$ is equal to or smaller than the reference angle, flowchart 2 is performed. In flowchart 2, as shown in the rotating movement of the stepping motor 40 in FIG. 6B, the ECU 1 transmits a low speed step signal to the stepping motor 40 to rotate the stepping motor 40 slowly (S111). The step signal for slow rotation is defined as 20 pps, as at step S108, and in this case, a step signal for 24 steps is issued. Thereafter, a step signal for rotating the stepping motor 40 in the reverse direction at a high speed (200 pps) is entered, for 12 steps, and the stepping motor 40 is set at the initial position I (S112). Then, a voltage detected by the angle sensor 44 is fetched (S113) and is employed to calculate a second current positional angle $\theta2$ (S114). Following this, a difference $\phi$ is calculated between the first current positional angle $\theta1$ and the second current positional angle $\theta2$, and is compared with a permissible error angle $\beta$ (S115). When the angle difference $\phi$ is smaller than the permissible error angle $\beta$, the initialization of the stepping motor 40 is terminated. The permissible error angle $\beta$ lies within an angle range of $\pm 1.0$ degree relative to the initial position I, or about 10 steps, and is set in advance, based on the error range, for the actual operation of the stepping motor 40 following the transmission of a step signal to the stepping motor 40.

Figure 6B:
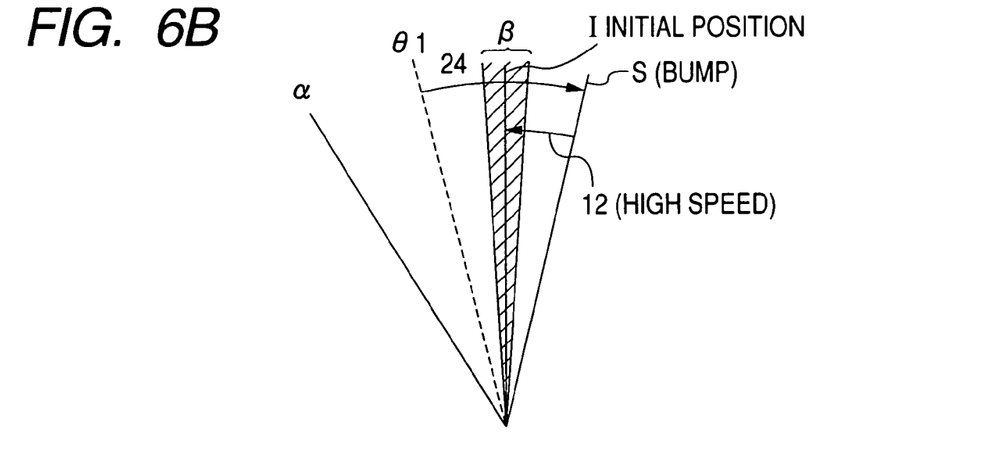

The reason for performing the flowchart 2 is as follows. In a normal AFS, the deflection angle positions for the headlamps area in a state wherein an automobile is halted and the ignition switch is off. When the automobile is halted, frequently, the steering angle aim is in the direction of forward movement, as are the lighting axes of the headlamps, i.e., the stepping motor is at the initial position I. Therefore, when the ignition switch of the automobile is next turned on, there is a high probability that the stepping motor 40 will be near the initial position I. That is, since there is a high probability that the first current positional angle $\theta1$ will be near the initial position I, the stepping motor 40 will probably be bumped a small number of steps, such as 24, instead of the initialization in the flowchart 1 being performed, i.e., the rotation of the stepping motor 40 across the wide angular range. Therefore, when the angle difference $\phi$ between the first position present angle $\theta1$ and the second position angle $\theta2$ is smaller than the permissible error angle $\beta$, either bumping is performed and the stepping motor 40 is returned to the initial position I, or even without bumping being performed, the stepping motor 40 is returned almost to the initial position I, and as a result, the initialization is completed. At this time, 24 steps is slightly greater than the number of steps (12+10) required for bumping, when the stepping motor 40 is located within the angular range wherein the probability is high that the first current positional angle $\theta1$ is present, i.e., within the range established for the permissible error angle $\beta$, in the direction opposite that of the bumped position relative to the initial position I, and is set as a multiple of four.

Therefore, in the flowchart 2, when the stepping motor 40 is located within an angular range smaller than the reference angle $\alpha$, as described above, bumping of the stepping motor 40 is performed for 24 steps at a low speed, while taking into account there is a high probability that the stepping motor 40 is located near the initial position I. Thus, the time required for bumping can be very much shorter than in the flowchart 1. In addition, since bumping is performed at a low speed, rebound vibration can be suppressed and the rebound time can be shortened. Moreover, the impact at bumping can be reduced, so that deterioration of the stepping motor 40 is be prevented.

When, at step S115, the angle difference $\phi$ between the first current positional angle $\theta1$ and the second current positional angle $\theta2$ is greater than the permissible error angle $\beta$, flowchart 3 is performed. That is, since the stepping motor 40 is not present within the range established for the permissible error angle $\beta$ of the initial position I, the stepping motor 40 can not be set at the initial position, even though flowchart 2 has been performed. In flowchart 3, as shown in the rotating movement of the stepping motor 40 in FIG. 6C, the ECU 1 enters a step signal for a low speed (20 pps) for an indicated 104 steps, and rotates the stepping motor 40 at a low speed to perform bumping (S121). Since it is assumed at step S103 that the stepping motor 40 is present at a position at an angle smaller than the reference angle $\alpha$, accurate bumping of the stepping motor 40 can be performed. At this time, the rotational speed of the motor 40 is low, almost no rebound vibrations occur at the bumped position S, as in flowchart 1, and the rebound time is extremely short. Then, after the stepping motor 40 is bumped, a step signal is entered for a high speed (200 pps) for an indicated 12 step movement, and the stepping motor 40 is returned 12 steps, at a high speed, in the direction the opposite of that to the initial position (S122). Thus, the initialization is terminated.

Figure 6C:
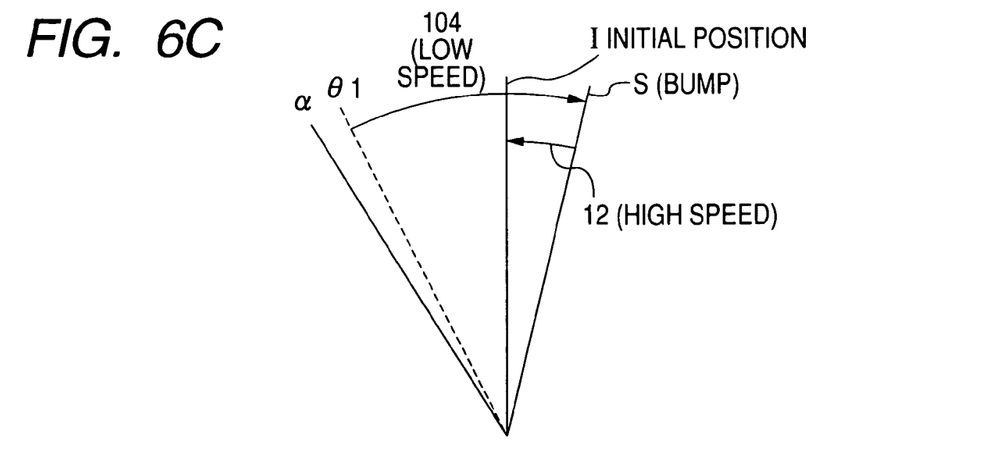

By performing flowchart 3, even when the initialization is disabled in flowchart 2, the time required for the stepping motor to be halted at the bumped position can be shortened, and as a result, the initialization time, for setting the stepping motor at the initial position, can be reduced. At the same time, when the stepping motor is rotating at a low speed when bumped, the impact reaction when the stepping motor 40 is bumped is dampened, and the deterioration of the stepping motor is prevented.

The rotational speeds of the stepping motor during the initialization are not limited to those mentioned in the embodiment, and a low rotation speed may especially be set as a desired speed for shortening the rebound time when the stepping motor is bumped. Further, the reference angle α and the permissible error angle β can be appropriately set based on the arrangements for the lamps and actuators that are employed, and especially on the accuracy of the actuators and the detection accuracy attained by angle sensors provided for the actuators.

The present invention is not limited to a stepping motor that is applied for an AFS, but can also be applied for controlling a stepping motor that provides leveling control for the vertical deflection of the lighting axis of a lamp.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An emitting direction control apparatus of a lamp, comprising:
    a driver that deflects an emitting direction of a lamp and includes a stepping motor that serves as a driving source for the driver; and
    a controller that controls the driver to perform a deflection, wherein the controller includes an initialization function for setting the stepping motor at an initial position, and the initialization function includes a function for detecting a first current positional angle of the stepping motor, rotating the stepping motor in a bumping direction at a high speed until a reference angle is reached when the first current positional angle is greater than the reference angle, rotating the stepping motor to a bumped position at an initial number of steps at a low speed after the reference angle is reached, and rotating the stepping motor in a reverse direction at a predetermined number of steps at a high speed and setting the stepping motor in the initial position after the bumped position is reached.

2. The emitting direction control apparatus according to claim 1, wherein the controller includes a function for rotating the stepping motor in the bumping direction at a second number of steps at a low speed when the first current positional angle is smaller than the reference angle, and thereafter rotating the stepping motor in a reverse direction at a predetermined number of steps to set the stepping motor in the initial position.

3. The emitting direction control apparatus according to claim 2, wherein the controller includes a function for detecting a second current positional angle after the stepping motor is set in the initial position, rotating the stepping motor to the bumping position at the first number of steps at a low speed when a difference between the first current positional angle and the second current positional angle falls outside a permissible angle range, and rotating the stepping motor at a predetermined number of steps in a reverse direction to set the stepping motor in the initial position after the bumping position has been reached.

4. The emitting direction control apparatus according to claim 1, wherein the lamp is a vehicle headlamp, and the driver swings the emitting direction of the vehicle headlamp lamp in a horizontal direction.

5. An emitting direction control method of a lamp, the method comprising:
    detecting a first current positional angle of a stepping motor that deflects an emitting direction of a lamp;
    rotating the stepping motor in a bumping direction at a high speed until a reference angle is reached, when the first current positional angle is greater than the reference angle;
    rotating the stepping motor to a bumped position at an initial number of steps at a low speed, after the reference angle is reached; and
    rotating the stepping motor in a reverse direction at a predetermined number of steps at a high speed and setting the stepping motor in the initial position, after the bumped position is reached.

6. The method according to claim 5, further comprising:
    rotating the stepping motor in the bumping direction at a second number of steps at a low speed, when the first current positional angle is smaller than the reference angle; and
    rotating the stepping motor, thereafter, in a reverse direction at a predetermined number of steps to set the stepping motor in the initial position.

7. The method according to claim 6, further comprising:
    detecting a second current positional angle, after the stepping motor is set in the initial position;
    rotating the stepping motor to the bumping position at the first number of steps at a low speed, when a difference between the first current positional angle and the second current positional angle falls outside a permissible angle range; and
    rotating the stepping motor at a predetermined number of steps in a reverse direction to set the stepping motor in the initial position, after the bumping position is reached.

* * * * *